United States Patent [19]

Adams et al.

[11] Patent Number: 4,831,531
[45] Date of Patent: May 16, 1989

[54] SYSTEM FOR THE PERFORMANCE OF ACTIVITY IN SPACE

[75] Inventors: Richard H. Adams, Red Wing; Alan E. Gross, Eden Prairie; Demetrius G. Jelatis, Red Wing; Carleton E. Jennrich, Welch; Rudolph O. Marohl, Red Wing, all of Minn.

[73] Assignee: Sargent Industries, Inc., Red Wing, Minn.

[21] Appl. No.: 17,066

[22] Filed: Feb. 20, 1987

[51] Int. Cl.⁴ ................................................. B25J 9/18
[52] U.S. Cl. ............................... 364/424.01; 244/161; 364/559; 364/513; 414/730; 414/5; 318/628
[58] Field of Search ........................ 364/424, 559, 513; 244/158 R, 161, 162; 318/568, 628; 414/2, 5, 730, 732, 735, 786

[56] References Cited

U.S. PATENT DOCUMENTS

| | | | |
|---|---|---|---|
| 3,503,273 | 3/1970 | Haaker et al. | 74/89.16 |
| 3,543,592 | 12/1970 | Haaker et al. | 74/89.16 |
| 3,543,593 | 12/1970 | Haaker et al. | 74/89.16 |
| 3,572,807 | 3/1971 | Haaker et al. | 294/106 |
| 3,893,573 | 7/1975 | Fletcher et al. | 414/2 |
| 4,079,904 | 3/1978 | Groskopfs et al. | 244/161 |
| 4,168,782 | 9/1979 | Sturges, Jr. | 414/4 |
| 4,221,516 | 9/1980 | Haaker et al. | 414/5 |
| 4,349,837 | 9/1982 | Hinds | 244/161 |
| 4,510,574 | 4/1985 | Guittet et al. | 364/513 |
| 4,636,137 | 1/1987 | Lemelson | 414/730 |
| 4,655,673 | 4/1987 | Hawkes | 414/730 |
| 4,657,211 | 4/1987 | Fuldner et al. | 244/161 |
| 4,661,032 | 4/1987 | Arai | 414/5 |
| 4,667,908 | 5/1987 | Hayden et al. | 244/161 |

OTHER PUBLICATIONS

Adams et al., "SAMSIN . . . The Next Generation Servo Manipulator", Proceedings of the 33rd Conference on Remote Systems Technology, American Nuclear Society, 1985, pp. 37–44.
Final Report for Telorobic Work System, vol. 1, Executive Summary, Apr. 1987, Gramman Space Systems.

*Primary Examiner*—Parshotam S. Lall
*Assistant Examiner*—Thomas G. Black
*Attorney, Agent, or Firm*—Burd, Bartz & Gutenkauf

[57] ABSTRACT

A system for remotely controlled performance of unmanned extravehicular activity in outer space, such as satellite maintenance and repair. The system comprises an orbitable space vehicle having a worksite accessible from the exterior of the vehicle and remotely controlled means associated with the space vehicle worksite for securing at the worksite the equipment in space upon which extravehicular activity is to be performed. At least one servo actuated manipulator slave subsystem is located adjacent to the worksite for performing work there. That slave subsystem is operatively interconnected to a remote manipulator master subsystem. A bilateral force reflective position control subsystem provides the hand of the operator of the master subsystem in a natural way with a sense of feel which is proportional to the loads applied by the operator through the slave subsystem and to loads imposed by the remote environment through the slave subsystem. A sensory subsystem conveys in a natural way to the operator sensory responses such as sight, sound, vibration, temperature, and the like, of the remote environment in which entravehicular activity is to be performed. A tool kit is provided for use with the system.

19 Claims, 6 Drawing Sheets

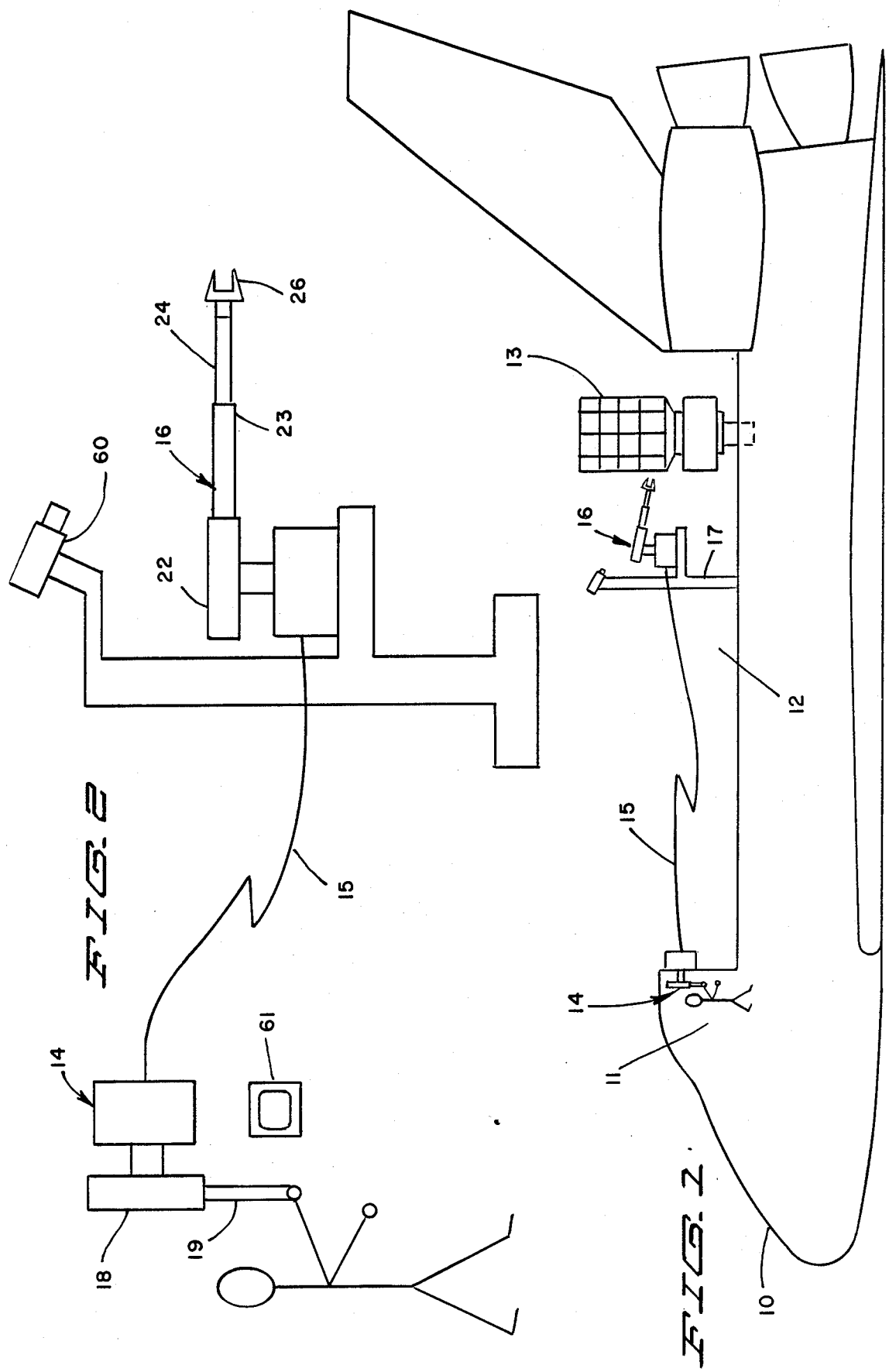

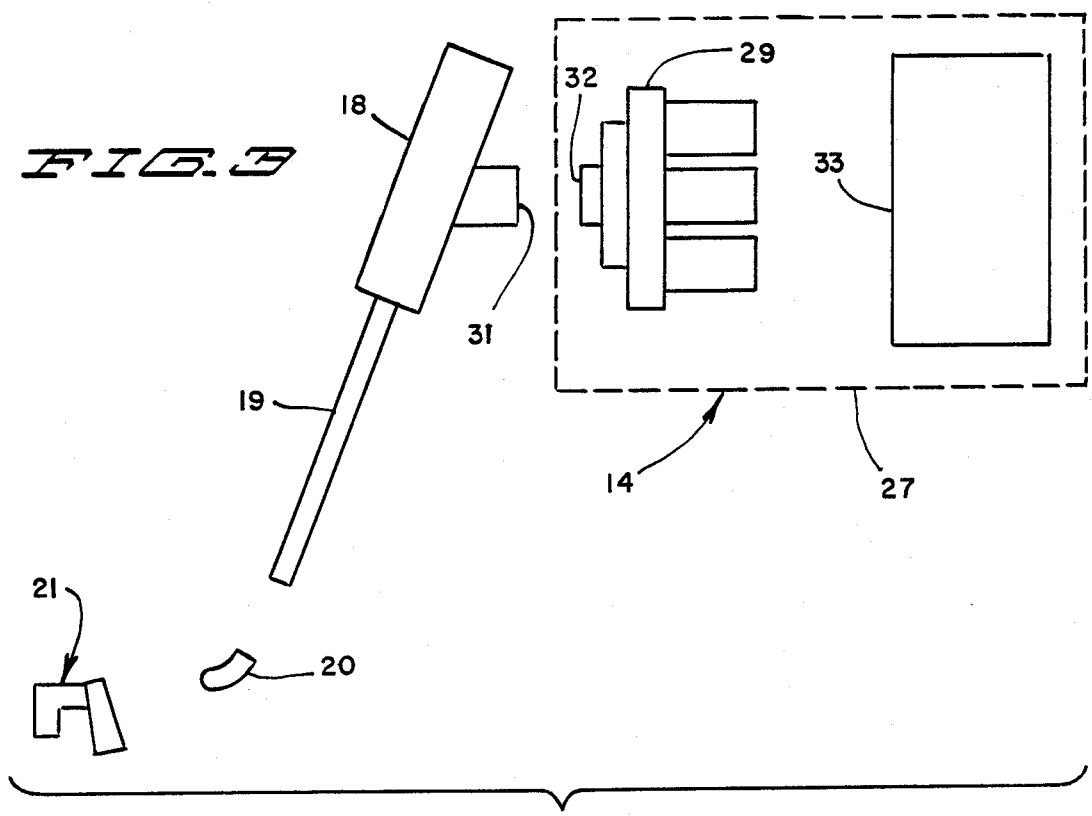
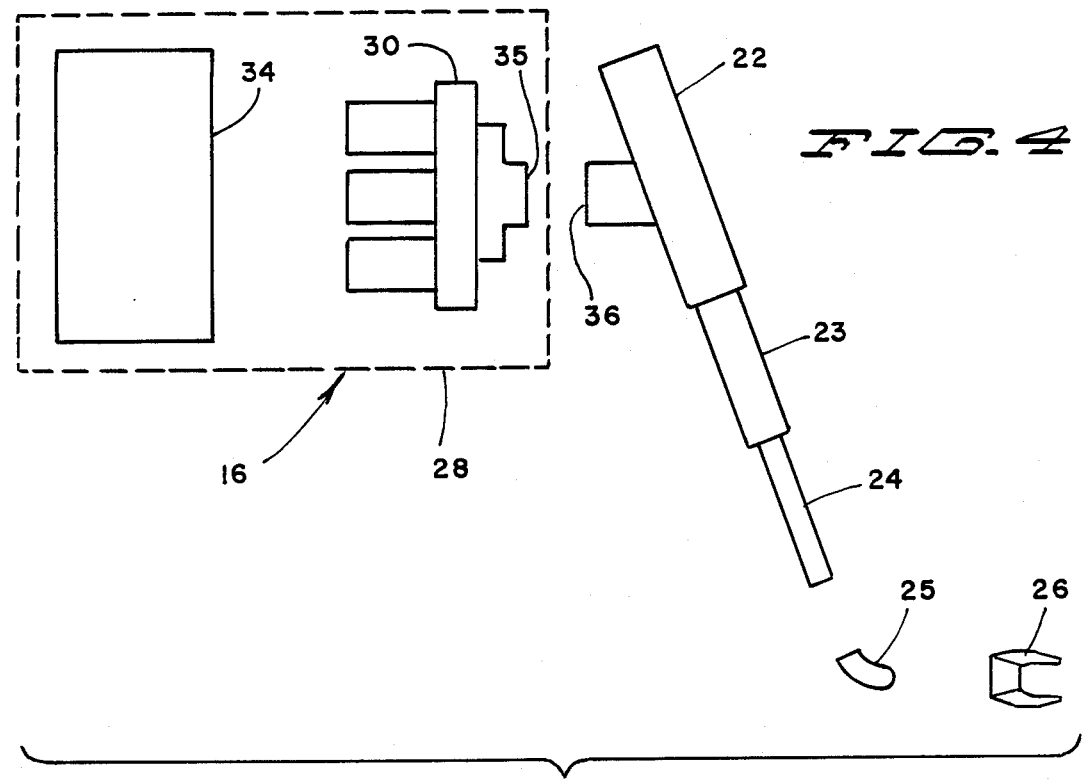

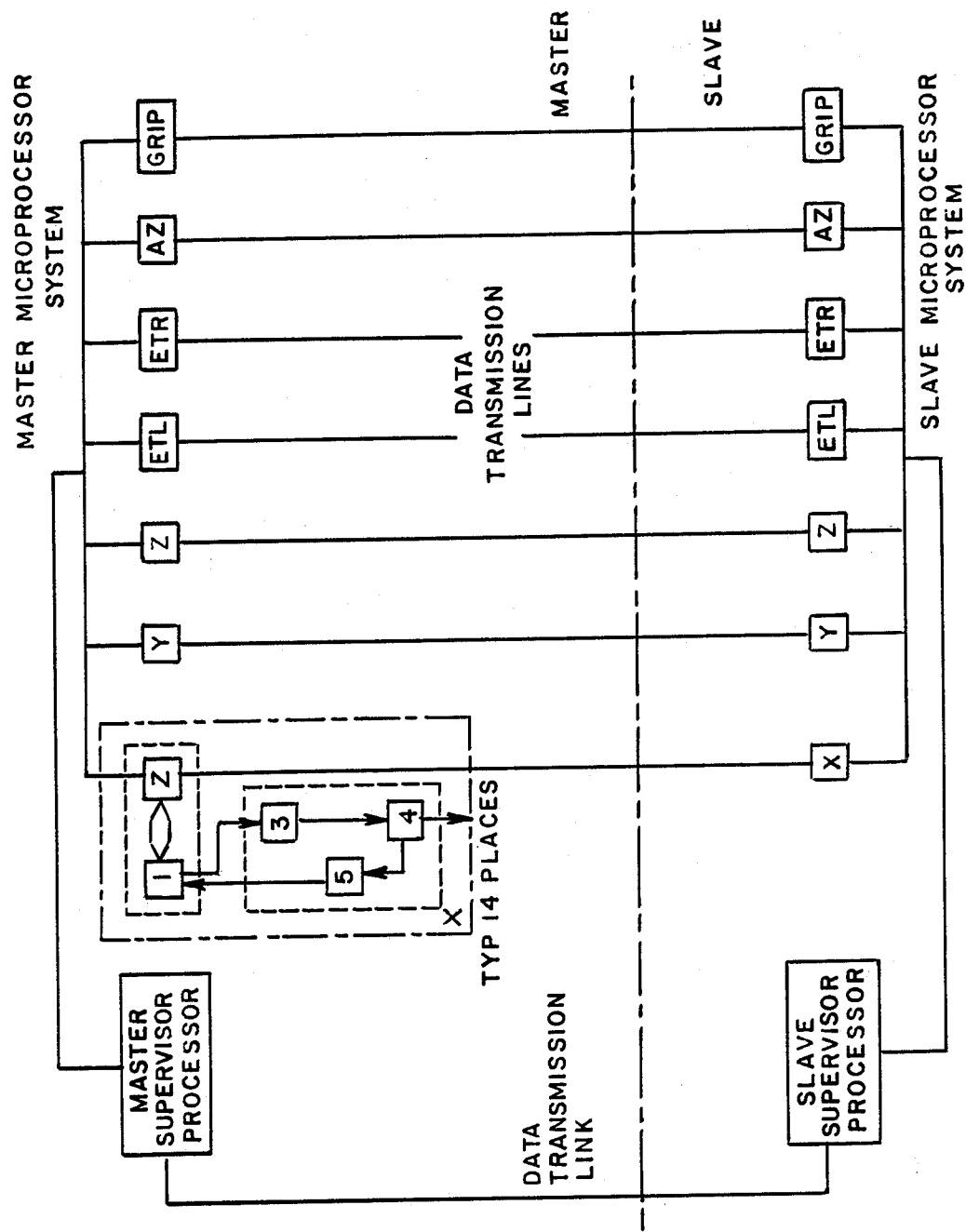

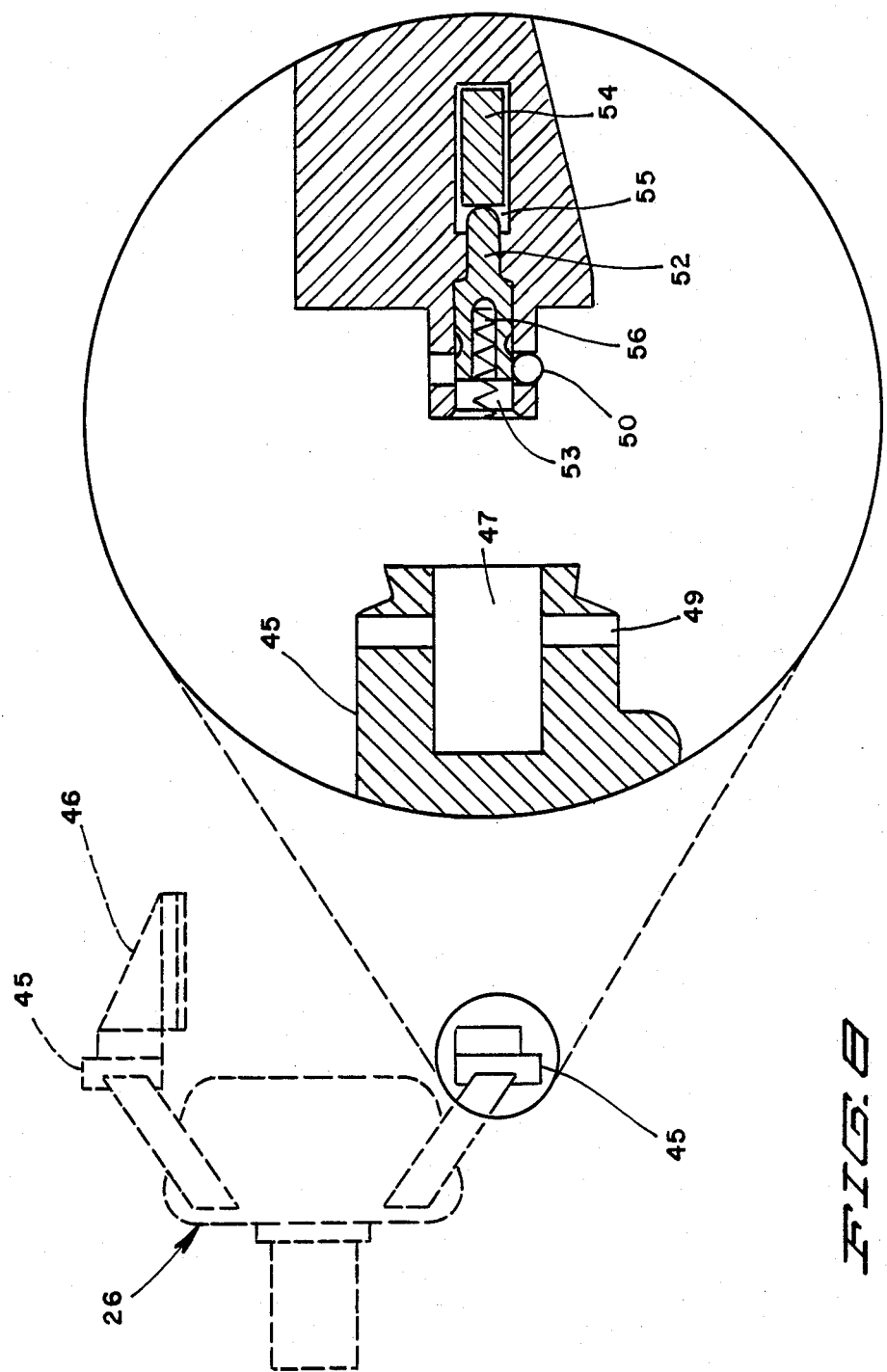

SYSTEM FOR THE PERFORMANCE OF ACTIVITY IN SPACE

FIELD OF THE INVENTION

BACKGROUND OF THE INVENTION

This invention relates to a system, comprising apparatus and method, for the performance of various activities in space, such as servicing, repair and maintenance of satellites, space craft, space transportation systems, space stations, and the like. More particularly, the invention relates to a system for the remotely controlled performance of unmanned extravehicular activity in space, as by example from the interior of an orbiting shuttle vehicle.

From time to time, equipment placed in space around the earth, such as communications satellites and the like, develop malfunctions. In many instances, the nature of the malfunction is known or can be ascertained and could be readily repaired if access to the equipment could be had. The most notable example of this was the Solar Maximum (Solar Max) satellite malfunction due to the failure of an electronic panel in the interior of the satellite. The malfunction was repaired by the replacement of the defective electronic panel in the course of the widely publicized Solar Maximum repair mission. However, the repair was delayed for more than two years, first by a year of development of a payload integration plan for the mission involving the development of hardware, scenarios, transition paths, worksites, tools, extravehicular activity techniques and associated operational support, and the like, followed by a year of training of the astronauts selected to perform the extravehicular repair activity. As part of the same mission, the attitude control system mounted on the exterior of the satellite was replaced and a baffle was placed over the exterior vent of the satellite's X-ray Polychromator unit.

To carry out the Solar Max repair mission, the STS-41C space shuttle, equipped with a remote manipulator system, was launched into orbit and maneuvered to rendezvous with Solar Max. With the shuttle parked near Solar Max, one astronaut using a manned maneuvering unit flew to the satellite and stopped its rotation. The satellite was grappled by the end of the shuttle's remote manipulator arm and brought by the arm to a berthing ring in the shuttle's cargo bay. The repair activities were carried out by two crewmen working outside of the shuttle, one from a work station having hand holds and foot restraints to hold the astronaut in place and located at the end of the remote manipulator arm, and the other moving freely about the cargo bay. The tools and equipment necessary for the repair tasks were stored in a tool locker in the cargo bay and the replacement parts were stored in a storage area and fixed in place.

To remove the electronics box, which is about the size of a brief case, and install a new one, the astronaut had to open a panel in the satellite's shell at the location of the box. He had to cut through the foil insulation and remove screws that secured a protective thermal blanket over the box. After taping the thermal blanket and insulation out of the way, he then had to install a hinge to convert the panel that covers the main electronics box into a door. The remaining screws retaining the panel were then removed and the panel opened, supported by the hinge. Cables from the electronics box were unplugged, the box was removed and passed to the other astronaut who then handed the replacement electronics box to his partner. The new box was installed, all connections were remated, the door was closed and secured, and the protective insulation was reattached. Thereafter, Solar Max was grappled by the manipulator arm and moved outside of the cargo bay for redeployment in orbit. The above procedure is described in greater detail in National Aeronautics and Space Administration Publication EP-205 entitled "Repairing Solar Max."

The Solar Max repair as described required the services of three astronauts, two of whom participated in the extra-vehicular activity while the third remained inside the shuttle cabin. Apart from the two year delay in making the Solar Max repair, all of the astronauts were subjected to the hazards of space flight and those participating in extra-vehicular activity were subjected to the additional hazards which that entails. It is the principal object of the present invention to provide a system by which servicing, repair and maintenance functions similar to the Solar Max repair may be carried out using a remotely operated bilateral force reflecting telerobotic system and remotely changeable tools operated from a gravity-free space craft cabin environment by a single crew member.

THE PRIOR ART

A space vehicle having an accessible exterior worksite and a remotely controlled manipulator arm with means to grapple and retrieve equipment which requires extravehicular servicing is disclosed in the aforesaid "Solar Max Repair" publication.

A servo actuated manipulator system useful in practicing the present invention is described in the paper coauthored by two of the inventors herein entitled "SAMSIN . . . The Next Generation Servo Manipulator" appearing in Proceedings of the 33rd Conference on Remote Systems Technology, American Nuclear Socity, 1985, pp. 37–44. The master and slave arms of the master-slave manipulator which are described in detail in U.S. Pat. No. 4,221,516 are exemplary of arms in which linear motions are translated into rotary motion, transmitted to a remote site and translated back into linear motion, which may be used in such a servo actuated manipulator system. The tong and wrist joint of U.S. Pat. No. 3,572,807 are exemplary of parts which may be used with the aforesaid slave arm. The teachings of the aforesaid paper and patents are incorporated herein by reference.

SUMMARY OF THE INVENTION

Broadly stated, the present invention is directed to a system for remotely controlled performance of unmanned extravehicular activity in outer space. The system comprises an orbitable space vehicle having a worksite accessible from the exterior of the vehicle and remotely controlled means associated with the space vehicle worksite for positioning and securing at the worksite the equipment in space upon which extravehicular activity is to be performed. At least one servo actuated manipulator slave subsystem is located adjacent to the worksite for performing work there. That slave subsystem is interconnected through a distributed digital communication system and data transmission link to a distributed digital communication system of a manually operated servo actuated manipulator master subsystem located remote from the slave subsystem.

In some instances the master subsystem may be located within the cabin of the space vehicle and physically connected to the slave subsystem, as by hard wiring. In other instances the master subsystem may be located in another space vehicle, or on earth, and linked through a radiant energy connection to the slave subsystem. In most instances, the system includes at least a pair of master and slave subsystems.

The slave and master subsystems are interconnected through a bilateral force reflective control subsystem which provides the hand of the operator of the master subsystem in a natural way with a sense of feel which is proportional to the external loads applied by the slave subsystem. A sensory subsystem is provided which includes means to convey to the operator in a natural way sensory responses of the remote environment in which extravehicular activity is to be performed. An appropriate tool kit is provided for use with the system, the nature of the specific tools being governed by the nature of the specific extravehicular repair or servicing task to be performed.

BRIEF DESCRIPTION OF THE DRAWINGS

The invention is illustrated by the accompanying drawings in which corresponding parts are identified by the same numerals and in which:

FIG. 1 is a schematic representation of an orbital space vehicle fitted with the system of the present invention for servicing of equipment in space;

FIG. 2 is a schematic representation on a larger scale showing the essential components of the system;

FIG. 3 is a schematic representation of a servo actuated manipulator master subsystem;

FIG. 4 is a schematic representation of a servo actuated manipulator slave subsystem;

FIG. 5 is a schematic circuit diagram of a distributed digital communication system comprising part of a communication link between the master and slave subsystems;

FIG. 8 is a schematic representation of a parallel jaw end effector positive locking interchangeable tool connector.

DETAILED DESCRIPTION OF THE PREFERRED EMBODIMENT

Figure 6:
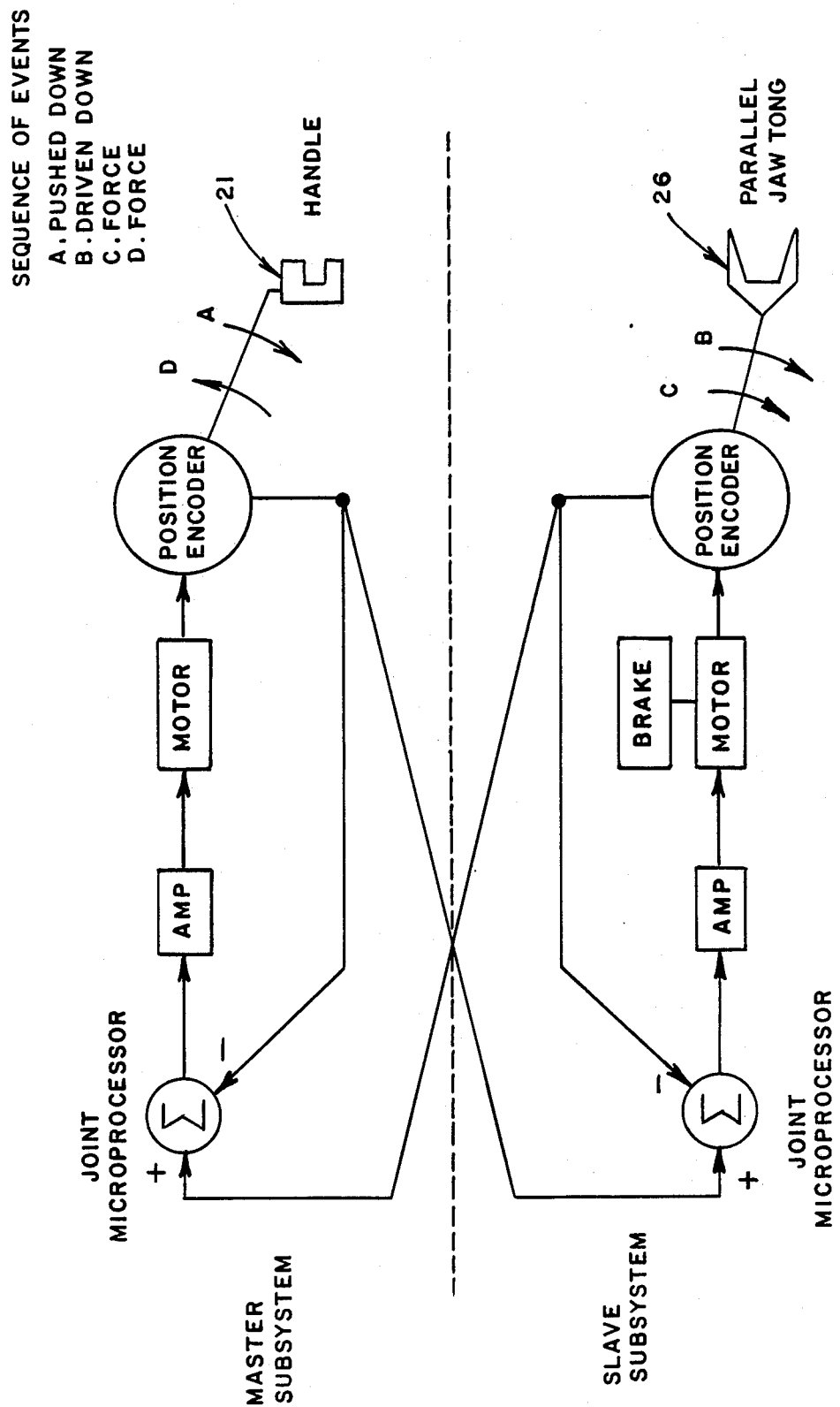
FIG. 6 is a block diagram of a bilateral force reflective position control subsystem comprising part of a communication link between the master and slave subsystems.

Referring now to the drawings, and particularly to FIG. 1, there is shown an orbital space vehicle 10 such as an STS-41C space shuttle having a closed cabin area 11 for housing an operator and an open cargo bay 12 for receiving equipment requiring servicing, maintenance or repair, such as a Solar Maximum mission satellite 13. Although the invention is described with particular reference to the Solar Max repair mission utilizing a manned space shuttle, the present invention is not limited to the use of any particular orbital space vehicle, manned or unmanned, nor to the servicing of any particular orbiting equipment. The vehicle may be a shuttle or space station to which the equipment to be serviced is brought upon retrieval from orbit, or the vehicle may be one which travels to and attaches itself to the orbiting equipment requiring servicing.

In the embodiment shown, the shuttle cabin is provided with a servo actuated manipulator master subsystem indicated generally at 14 and connected through a data transmission link 15 to a servo actuated manipulator slave subsystem, indicated generally at 16, and located in the shuttle bay 12. The slave subsystem 16 is mounted, for example, on a transporter 17. The transporter may be equipped with wheels or rollers for movement on a track or otherwise adapted for positioning within the shuttle bay 12 in close proximity to the equipment 13 to be serviced. In the case of an orbital vehicle designed to travel to and attach itself to the equipment to be serviced, the slave subsystem may be mounted on the exterior of the vehicle as a so-called "smart front end" unit. Exemplary orbiting equipment which may be serviced according to the present invention include the Hubble Telescope (HST), Gamma Ray Observatory (GRO), Upper Atmosphere Research Satellite (UARS), Extreme Ultra-Violet Explorer (MMS-EUVE), X-Ray Timing Explorer (MMS-XTE), Earth Observation Satellite (EOS), Cosmic Origin Background Experiment (COBE), Landsat Satellites, and the like.

Where the master and slave subsystems are in relatively close proximity, the data transmission link 15 may be a direct hard wire connection. However, where the master and slave systems are remote from one another, as where the operator and master subsystem are on earth, or in an orbital vehicle other than that carrying the slave subsystem, then the data transmission link 15 may be a radiant energy connection, as by means of laser beams, microwaves, and the like. The space vehicle 10 is provided with a long articulated remote manipulator arm to grapple and retrieve the equipment to be serviced in the cargo bay, as described in the aforementioned Solar Max Repair publication.

Referring now to FIGS. 2 through 4, the system of the present invention is shown in greater detail. The master subsystem 14 includes a pivotally supported master manipulator trunk tube 18 and a longitudinally reciprocable telescopic boom tube 19 such as is described generally in the aforesaid U.S. Pat. No. 4,221,516. The lower end of the movable boom tube carries a wrist joint 20. The wrist joint should be capable of near human articulation, which may be of the type illustrated and described in U.S. Pat. Nos. 3,503,273; 3,543,592 and 3,543,593. The master wrist joint 20 is adapted to be fitted with a control handle 21, as described hereinafter in greater detail. As described in the aforesaid U.S. Pat. No. 4,221,516, the linear motions of the hand of the operator through control handle 21 are translated into rotary motions for transmission to the slave subsystem 16 and retranslated into linear motion as hereinafter described in detail.

The slave subsystem 16 includes a slave manipulator arm comprised of a plurality of telescoping tubular segments, a pivotally supported trunk tube 22, an intermediate tube 23 of lesser diameter, and a boom tube 24 of still lesser diameter, the intermediate and boom tubes being longitudinally movable relative to the trunk tube. A wrist joint 25 corresponding to the master arm wrist joint 20 is mounted on the outermost end of the boom tube 24. Wrist joint 25 in turn supports a parallel jaw tong 26. Tong 26 is preferably of the type illustrated and described in the aforesaid U.S. Pat. No. 3,572,807.

Each of the master and slave subsystems includes a bilateral force reflective control subsystem, 27 and 28, respectively, as described in greater detail in connection with the schematic diagrams of FIGS. 5 and 6. The combined force reflective subsystems permit the hand of the operator of the master subsystem to feel directly in a natural way the effects of the loads applied by the operator through the slave subsystem and to the loads imposed by the remote environment through the slave subsystem. For example, if a hole is being drilled the operator can feel when the material has been penetrated by the drill bit, just as if he were holding the drill in his hand. Or, if a screw is being tightened or loosened, the operator can feel when the screw has been driven home, or is freed, just as if the screw driver were held in his hand.

Each of the master and slave subsystems includes a servo actuated electric motor package, 29 and 30, respectively. Each motor package preferably includes an affordable off-the-shelf brushless DC motor (e.g., Electro Craft, Model BLM, Part No. ES 720679201) for each of three translational and three rotational motions and for gripping. Other types of electric motors which may be used include variable reluctance or hysterisis type motors, AC or DC brush-type motors, or the like. As is well understood in the art, these include lateral or X motion, forward and backward or Y motion, extension or Z motion, and elevation, twist and azimuth rotation of the wrist joint.

The actions of the operator moving the control handle 21 are transmitted from the master manipulator arm to the master motor package 29 through a rotary interface 31-32 such as is illustrated and described in the aforesaid U.S. Pat. No. 4,221,516. The signal generated by each movement is transmitted through the master electronics module 33 and communications link 15 to the slave electronics module 34, slave motor package 30 and rotary interface 35-36 to the slave manipulator arm. Each movement of the master control handle is thus transmitted to the slave tong. In turn, each force or load imposed on the tong in the remote environment is transmitted back and is felt by the hand of the operator, as described in greater detail with reference to FIG. 6.

The distributed digital communication system connecting the master and slave manipulator arms is shown diagrammatically in FIG. 5. As shown, each of the master and slave microprocessor systems includes a supervisor processor (e.g., Intel, SBC 286/100 and Intel, iSBX 352 Bit Serial Communications). For each of the translational and rotational motions and gripping, typically fourteen places, there is provided a control package of components shown in detail with reference to the master X motion, but not repeated for the other motions. Each such package includes a joint motion microprocessor (e.g., Intel, RCB 4410 Remote Controller Board), a joint communications microprocessor (e.g., Intel iSBX 352 BIT Serial Communications Board), a drive amplifier such as a pulse width modulated drive amplifier (e.g., Electro Craft OPS Series, BVC 4 Quadrant) and a position encoder (e.g., Hewlett-Packard, HEDS-6010) to control each brushless DC motor. In addition, each slave package includes an electromechanical brake (e.g., Inertia Dynamics, No. FSB-015).

As seen with reference to FIG. 6, the bilateral force reflective position control system functions as follows. On system startup, all positions are initialized to zero. When the operator moves the control handle 21, the position of the master joint is transmitted to the slave joint and becomes the slave set point position. The slave joint subsystem microprocessor compares the set point position to the current local slave position. A difference between these two positions produces a voltage signal to the amplifier proportional to this difference. The amplifier then produces a corresponding current signal to the motor windings that results in motor rotation that will minimize the position difference between the set point position and the current slave position.

The current slave position is transmitted to the master joint and becomes the master set point position. As described above, any difference between the set point and local positions results in motor rotation at the local joint to minimize the position difference. These calculations and data transmissions are done at a sufficiently high rate to maintain stability in the manipulator system.

In this manner, when the operator grasping the handle pushes down on the master manipulator arm (A), the slave manipulator arm moves down proportional to the master arm motion (B) with a particular force (C). The force required to move the slave arm (C) is reflected back to the operator's hand (D). This force (D) is equal to or proportional to the force (C).

Figure 7:
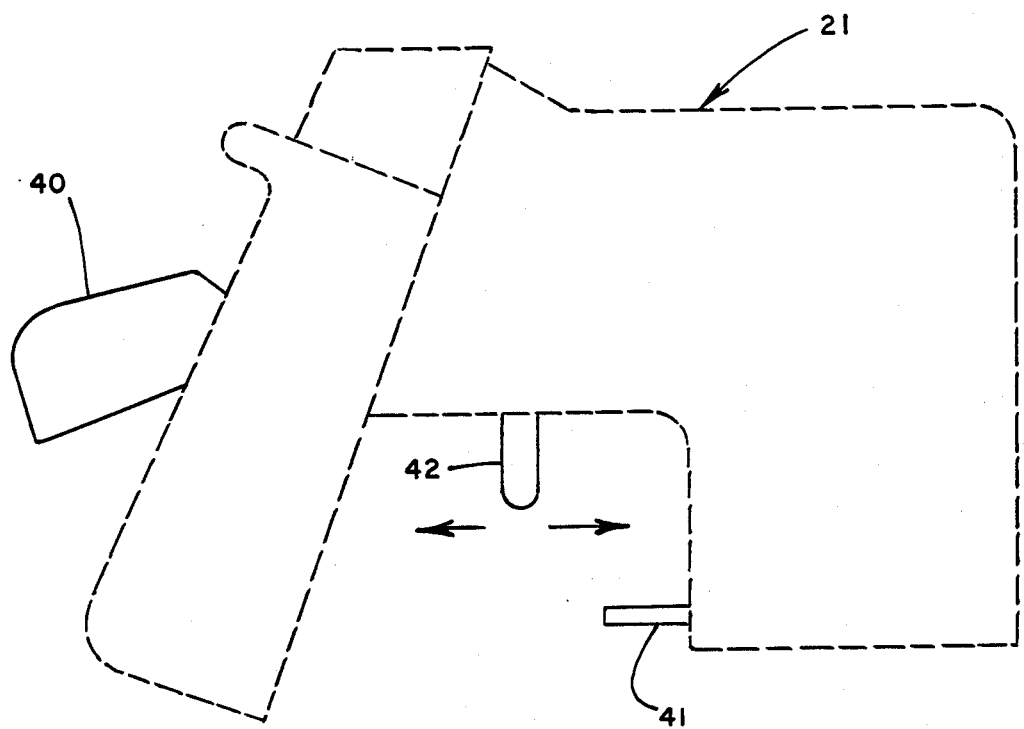
FIG. 7 is a schematic representation of a master arm manipulator control handle showing the location of switches thereon.

Referring to FIG. 7, the control handle 21 is provided with an on-off deadman switch 40 which controls the master motor power. The system is functional when the operator's hand is placed on the handle 21 depressing switch 40. The master motor power is then turned on rendering the master-slave mode functional. When the operator's hand is removed from the handle, the master motor power is turned off and the slave arm servos remain at the last known master positions.

An on-off index switch 41 permits the master motor power to be turned off and the master arm indexed relative to the slave arm. The slave arm servos remain at the last known master positions for the three translational and three rotational motions. Then, with the operator holding the switch with the master motor power turned off, the operator can position the master arm to any desired position without affecting the position of the slave arm. When the index switch is turned off, the master-slave mode is operational in the new indexed position.

Locking functions are achieved by means of on-off toggle switch 42. When the all-lock toggle switch is switched on by movement in one direction, all seven slave motions are servo-locked and the grip motion is servo-locked at the master. To minimize heating of the motors, the slave brakes are set for the three translational and three rotational motions after a predetermined time interval (e.g., 65 seconds) after the operator's hand is removed from the master handle. Power is removed from these six slave motions only if the slave brakes are set. The grip master-slave motion remains servo-locked. When the all lock function is switched off, power is applied to the six slave motions when the operator's hand is placed back onto the master handle. If set, the slave brakes are released when the all-lock function is turned off and the manipulator master-slave mode is again operational.

Toggle switch 42 when moved in the opposite direction functions as a grip lock switch. When the grip lock function is switched on, the grip master and slave motions servo lock and the grip lock is maintained even though the operator's hand is removed from the master handle. The grip lock function may be switched off only if the operator's hand is on the master handle.

The switches may be used in combination. Both the grip lock and all-lock can be switched on together. The all-lock does not affect the grip lock. If both are on when the all-lock is turned off, the grip lock remains operational. The grip lock and index switches may be used together to permit the operator to maintain the grip lock as the other six manipulator motions are indexed.

A variety of interchangeable tools are provided for use with the servicing system, the specific tools being dependent upon the service activity to be performed. Typical tools include a cordless electric drill, manual and cordless electric screwdrivers, wrenches, knives, scissors, and the like. Each tool is provided with a positive locking interchangeable connector adapted to engage the jaw socket of the tong 26. As seen in FIG. 8, the tong 26 includes a pair of jaw sockets 45 each adapted to receive a removable tong jaw 46 or the connector of an interchangeable tool. The jaw socket 47 is adapted by size and shape to receive the shank 48 of a tong jaw or tool connector. A transverse passage 49 intersects recess 47, the inner end of which receives ball 50, in a corresponding transverse passage 51 in shank 48, to positively lock the jaw or tool connector in the jaw socket.

Ball 50 is maintained in positive locking position by means of a spring biased plug 52 which is reciprocable in recess 53 in the shank 48. Plug 52 is caused to reciprocate by part of a tool holding fixture and a cam wedge 54 which is insertable in transverse slot 55 in the body of the jaw or tool connector. Inserting of wedge 54 depresses plug 52 to release the locking ball 50 into recess 55 on the periphery of the plug.

The remote extravehicular servicing system according to the present invention also includes sensing means by which the operator may be apprised of sensory conditions of the remote environment in which the extravehicular activity takes place. The most important of these is vision. Where the operator is on board the space vehicle on which the activity is being performed, the visual sensing means may be as simple as a window. However, for performing close and intricate work, as seen in FIG. 2, remote viewing as by television cameras 60 and monitors 61, is preferable. The television cameras may be mounted on the slave arm transporter 17. For maximum visibility one or more additional master and slave systems are desirable for positioning the cameras in the most advantageous positions for maximum close-up visibility. Other sensory responses are desirable to enable the operator to feel and sense in a natural way the activity occurring in the remote area. Mechanically transmitted sound may be sensed by mounting a microphone on one of the slave arms linked to a speaker in the operator's area. Other sensing devices may be used to detect temperature, vibration, particles such as smoke, gases, and the like.

It is apparent that many modifications and variations of this invention as hereinbefore set forth may be made by those skilled in the art without departing from the spirit and scope thereof. The specific embodiments described are given by way of example only and the invention is limited only by the terms of the appended claims.

We claim:

1. A system for the remotely controlled performance of unmanned extravehicular activity in outer space, which system comprises:
   (A) an orbitable space vehicle having
      (1) a worksite accessible from the exterior of said vehicle and
      (2) means associated with said space vehicle worksite for securing of the worksite equipment in space upon which extravehicular activity is to be performed comprising a remotely controlled manipulator grapple means associated with the worksite for positioning the equipment from space and securing it at the worksite,
   (B) at least one separate servo actuated manipulator slave subsystem located adjacent said worksite for performing work therein on the equipment from space positioned by said manipulator grapple means,
   (C) a manually operated separate servo actuated manipulator master subsystem for each slave subsystem, said master subsystem being remote from said slave subsystem and operatively connected thereto,
   (D) a distributed digital communication system within each of said slave and master subsystems,
   (E) a data transmission link between said digital communications systems,
   (F) a bilateral force reflective position control subsystem for said slave and master subsystems providing in a natural way a sense of feel directly to the hand of the operator of the master subsystem which is proportional to the loads applied by the operator through the slave subsystem and to loads imposed by the remote environment through the slave subsystem, and
   (G) a sensory subsystem including means to convey to the operator in a natural way other sensory responses of the remote environment in which extravehicular activity is to be performed.

2. A system according to claim 1 wherein said master subsystem is located within the cabin of said space vehicle and said data transmission link is a hard wire or radiant energy connection between said master and slave subsystems.

3. A system according to claim 1 wherein said master subsystem is located remote from the space vehicle carrying said slave subsystem and said data transmission link is a radiant energy connection between said master and slave subsystems.

4. A system according to claim 1 wherein said worksite is an open bay within the space vehicle.

5. A system according to claim 1 wherein said slave subsystem comprises:
   (A) a manipulator slave arm having a wrist joint capable of near human articulation at the free end thereof, said wrist joint having a tong adapted to receive any of a plurality of interchangeable work performing tools,
   (B) a servo actuated electric motor package including:
      (1) a position encoder, and
      (2) an electromechanical brake,
   (C) a rotary interface between said motor package and manipulator arm, and
   (D) an electronics module operatively connected to said motor package and enclosing
      (1) drive amplifiers and
      (2) microprocessor motion controller means for each motion to be performed by the manipulator slave arm.

6. A system according to claim 5 wherein said wrist joint tong includes a parallel jaw end effector having means for engaging and disengaging said interchangeable tools.

7. A system according to claim 5 wherein said master subsystem comprises:
(A) a manipulator master arm having a manually operable control handle at the free end thereof,
(B) a servo actuated electric motor package including a position encoder,
(C) a rotary interface between said manipulator arm and motor package, and
(D) an electronics module operatively connected to said motor package and enclosing
 (1) drive amplifiers and
 (2) microprocessor motion controller means corresponding to each motion to be performed by the slave arm.

8. A system according to claim 7 wherein:
(A) said slave and master servo actuated motor packages each include a servo motor for each of three translational and three rotational motions and for gripping, and
(B) switch means are provided for controlling power supply to each motor package and to each individual motor.

9. A system according to claim 8 wherein:
(A) said master arm control handle includes a deadman power supply switch whereby the system is operable only when the operator's hand is on the handle,
(B) said master arm control handle includes an on-off master motor package power supply indexing switch whereby the master arm power supply may be turned off and the master arm positioned independently of the position of the slave arm,
(C) said slave subsystem includes an electromechanical brake for each translational, rotational and gripping motion and said master arm control handle includes an on-off toggle locking switch whereby said brakes may be set and slave arm motion locked, and
(D) a separate on-off toggle locking switch is provided on said master arm control handle for independently locking the gripping motion.

10. A system according to claim 7 wherein each of said distributed digital communication systems includes a master and slave supervisor processor and said data transmission link comprises an interconnection between said supervisor processors and the microprocessor controllers of the master and slave subsystems for each manipulator motion.

11. A system for the remotely controlled performance of unmanned extravehicular activity in outer space, which system comprises:
(A) an orbitable space vehicle having
 (1) a worksite accessible from the exterior of said vehicle and
 (2) remotely controlled manipulator grapple means associated with said space vehicle worksite for retrieving from space and for positioning and securing at the worksite equipment in space upon which extravehicular activity is to be performed,
(B) at least one separate servo actuated manipulator slave subsystem located adjacent said worksite for performing work therein, said slave subsystem comprising:
 (1) a manipulator slave arm having a wrist joint capable of near human articulation at the free end thereof, said wrist joint having a tong adapted to receive any of a plurality of interchangeable work performing tools,
 (2) a servo actuated brushless DC motor package including:
  (a) a position encoder, and
  (b) an electromechanical brake,
 (3) a rotary interface between said motor package and manipulator arm, and
 (4) an electronics module operatively connected to said motor package and enclosing
  (a) pulse width modulated drive amplifiers and
  (b) microprocessor motion controller means for each motion to be performed by the manipulator slave arm,
(C) a manually operated separate servo actuated manipulator master subsystem for each slave subsystem, said master subsystem being located remote from said slave subsystem and operatively connected thereto, said master subsystem comprising:
 (1) a manipulator master arm having a manually operable control handle at the free end thereof,
 (2) a servo brushless DC actuator motor package including a position encoder,
 (3) a rotary interface between said manipulator arm and motor package, and
 (4) an electronics module operatively connected to said motor package and enclosing
  (a) pulse width modulated drive amplifiers and
  (b) microprocessor motion controller means corresponding to each motion to be performed by the slave arm,
(D) a distributed digital communication system within each of said slave and master subsystems, each including a supervisor processor,
(E) a data transmission link between said digital communications system, said links comprising an interconnection between said supervisor processor and the microprocessor controllers of the master and slave subsystems for each manipulator motion,
(F) a bilateral force reflective position control subsystem for said slave and master subsystems providing in a natural way a sense of feel directly to the hand of the operator of the master subsystem which is proportional to the loads applied by the operator through the slave subsystem, and to loads imposed by the remote environment through the slave subsystem, and
(G) a sensory subsystem including means to convey to the operator of the master subsystem in a natural way other memory responses of the remote environment in which extravehicular activity is to be performed.

12. A system according to claim 11 wherein said master subsystem is located within the cabin of said space vehicle and said data transmission link is a hard wire or radiant energy connection between said master and slave subsystems.

13. A system according to claim 11 wherein said master subsystem is located remote from the space vehicle carrying said slave subsystem and said data transmission link is a radiant energy connection between said master and slave subsystems.

14. A system according to claim 11 wherein said worksite is an open bay within the space vehicle.

15. A system according to claim 11 wherein said wrist joint tong includes a parallel jaw end effector having means for engaging and disengaging said interchangeable tools.

16. A system according to claim 11 wherein:

(A) said slave and master servo brushless DC actuator motor packages each include a servo motor for each of three translational and three rotational motions and for gripping, and
(B) switch means are provided for controlling power supply to each motor package and to each individual motor.

17. A system according to claim 16 wherein:
(A) said master arm control handle includes a manually squeezeable on-off deadman power supply switch whereby the system is operable only when the operator's hand is on the handle,
(B) said master arm control handle includes an on-off master motor package power supply indexing switch whereby the master arm power supply may be turned off and the master arm positioned independently of the position of the slave arm,
(C) said slave subsystem includes an electromechanical brake for each translational, rotational and gripping motion and said master arm control handle includes an on-off toggle locking switch whereby said brakes may be set and slave arm motions locked, and
(D) a separate on-off toggle locking switch is provided on said master arm control handle for independently locking the gripping motion.

18. A system according to claim 11 wherein the system includes at least a pair each of slave and master subsystems.

19. A system according to claim 18 wherein the system includes at least a third slave subsystem and third master subsystem, the primary function of which is to support at least one closeup television camera at the free end of the slave manipulator arm thereof, for maneuvering and positioning independently of the work performing arms responsive to the manual operation of the third master subsystem.

* * * * *